United States Patent
Croll et al.

(10) Patent No.: US 8,819,817 B2
(45) Date of Patent: Aug. 26, 2014

(54) METHODS AND APPARATUS FOR BLOCKING USAGE TRACKING

(75) Inventors: Brian Croll, Los Altos, CA (US); Darin B. Adler, Los Gatos, CA (US); Kevin W. Decker, San Jose, CA (US); Steven J. Falkenburg, Los Altos, CA (US); Timothy G. Hatcher, Tracy, CA (US); Jing Jin, Sunnyvale, CA (US); Donald D. Melton, San Carlos, CA (US); Maciej Stachowiak, San Francisco, CA (US); Samuel M. Weinig, Sunnyvale, CA (US); Brian A. Weinstein, San Jose, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 13/115,880

(22) Filed: May 25, 2011

(65) Prior Publication Data

US 2012/0304286 A1  Nov. 29, 2012

(51) Int. Cl.
| | |
|---|---|
| *G06F 12/14* | (2006.01) |
| *G06F 21/62* | (2013.01) |
| *G06F 21/60* | (2013.01) |
| *H04L 29/08* | (2006.01) |
| *G06Q 30/02* | (2012.01) |

(52) U.S. Cl.
CPC ............. *G06F 21/6263* (2013.01); *H04L 67/22* (2013.01); *G06F 21/62* (2013.01); *G06Q 30/02* (2013.01); *G06F 21/60* (2013.01); *G06Q 30/0201* (2013.01)
USPC ................. 726/22; 726/26; 726/27; 713/189

(58) Field of Classification Search
CPC ..... G06F 21/6263; G06F 21/60; G06F 21/62; H04L 67/22; G06Q 30/02; G06Q 30/0201
USPC ................. 726/22, 26, 27; 713/189
See application file for complete search history.

(56) References Cited

U.S. PATENT DOCUMENTS 6,112,238 A * 8/2000 Boyd et al. .................... 709/224
7,603,356 B2 10/2009 Schran et al.
(Continued)

FOREIGN PATENT DOCUMENTS

WO  WO 2005/078549 A1  8/2005

OTHER PUBLICATIONS

"How to Remove Tracking Cookies to Protect Your Privacy," SafetyWeb, Inc., Mar. 2011, downloaded from http://www.myid.com/how-to-delete-tracking-cookies-do-not-track-online, Apr. 4, 2011, 2 pages.

(Continued)

*Primary Examiner* — Dede Zecher
*Assistant Examiner* — Sarah Su
(74) *Attorney, Agent, or Firm* — Blakely, Sokoloff, Taylor & Zafman LLP

(57) ABSTRACT

Methods and apparatuses that maintain one or more data stores capable of storing local data in a device for loading a resource of a domain are described. The resource may be loaded to cause one or more data access operations on the data stores. Access to usage tracking data of the device from the domain may depend on at least one of the data access operations. The data access operations may be configured to block the usage tracking data of the device from the domain. The data access operations may be performed on the data stores for the loading of the resource. A web page may be presented to a user when the resource is successfully loaded.

20 Claims, 8 Drawing Sheets

(56) References Cited

U.S. PATENT DOCUMENTS

| | | | |
|---|---|---|---|
| 8,244,910 B2* | 8/2012 | Davis | 709/246 |
| 2002/0161890 A1* | 10/2002 | Chen | 709/226 |
| 2004/0098486 A1* | 5/2004 | Gu et al. | 709/228 |
| 2004/0162912 A1* | 8/2004 | Taraci | 709/233 |
| 2005/0015429 A1* | 1/2005 | Ashley et al. | 709/200 |
| 2006/0111943 A1* | 5/2006 | Wu | 705/3 |
| 2006/0123340 A1* | 6/2006 | Bailey et al. | 715/700 |
| 2006/0129681 A1* | 6/2006 | Sendra | 709/229 |
| 2006/0212548 A1* | 9/2006 | Faisal et al. | 709/220 |
| 2006/0265495 A1* | 11/2006 | Butler et al. | 709/224 |
| 2007/0157289 A1* | 7/2007 | Newton et al. | 726/2 |
| 2008/0034160 A1* | 2/2008 | Neiman et al. | 711/118 |
| 2008/0083012 A1* | 4/2008 | Yu et al. | 726/1 |
| 2008/0235565 A1* | 9/2008 | Ackerman et al. | 715/205 |
| 2010/0050245 A1* | 2/2010 | Samatov | 726/8 |
| 2010/0095082 A1* | 4/2010 | Hull et al. | 711/171 |
| 2010/0125668 A1 | 5/2010 | Bocchieri et al. | |
| 2010/0293591 A1* | 11/2010 | Shah | 726/1 |
| 2011/0173525 A1* | 7/2011 | Mukhopadhyay et al. | 715/212 |
| 2012/0174236 A1* | 7/2012 | Goodwin et al. | 726/27 |
| 2012/0272338 A1* | 10/2012 | Falkenburg et al. | 726/30 |

OTHER PUBLICATIONS

International Search Report and the Written Opinion of the International Search Authority, mailing date May 24, 2013, for corresponding International Application No. PCT/US2012/037203, 27 pages.

Jackson, et al., "Protecting Browser State from Web Privacy Attacks", WWW '06 Proceedings of the 15$^{th}$ International Conference on World Wide Web, May 23, 2006, pp. 737-743, http://www-cs.stanford.edu/people/jcm/papers/sameorigin.pdf.

Nicolas Sylvain, "A New Approach to Browser Security: the Google Chrome Sandbox", Oct. 2, 2008, pp. 1-4, http://blog.chromium.org/2008/10/new-approach-to-browser-security-google.html.

Robby Garrison, "Screenshot: Dan's Guardian Log", Apr. 16, 2002, p. 1, web.archive.org/web/20020416085430/http://dansguardian.org/downloads/garrison/parser-screenshot.png.

Kristol, et al., "HTTP State Management Mechanism, rfc2965.txt", Internet Engineering Task Force, IETF, Oct. 1, 2000.

M. Pool, "Meantime: Non-Consensual HTTP User Tracking Using Caches", Jan. 9, 2001, p. 5pp, http://sourcefrog.net/projects/meantime/.

Mukund Sivaraman, "Clearing Cookies is Not Enough to Save Your Privacy", Sep. 24, 2006, pp. 1-2, htt://web.archive.org/web/20060924145002/http://www.mukund.org/blog/101.

Felten, et al., "Timing Attacks on Web Privacy", Proceedings of the 7$^{th}$ ACM Conference on Computer and Communications Security. CS 2000., vol. CONF. 7, Nov. 1, 2000,pp. 25-32, Athens, Greece.

Daniel Barron, "Introduction" DansGuardian, Apr. 7, 2002, p. 1, http://web.archive.org/web/20020407161049/http://dansguardian.org/?page=introduction.

International Preliminary Report on Patentability mailed Dec. 5, 2014, for International Patent Application No. PCT/US2012/037203, 20 pages.

* cited by examiner

400

Maintaining one or more data stores capable of storing local data in a device for loading a resource of a domain, the loading of the resource to cause one or more data access operations on the data stores, wherein access to usage tracking data of the device from the domain depends on at least one of the data access operations  401

Configuring the data access operations to block the usage tracking data of the device from the domain  403

Performing the data access operations on the data stores for the loading of the resource, wherein the resource is successfully loaded for a presentation of a web page to a user  405

Fig. 4

METHODS AND APPARATUS FOR BLOCKING USAGE TRACKING

FIELD OF INVENTION

The present invention relates generally to blocking usage tracking from websites. More particularly, this invention relates to dynamically detecting usage tracking from websites and adjusting local storage mechanisms provided for these websites to block usage tracking across different types of data.

BACKGROUND

With the increase in the popularity of the web (or World Wide Web), more and more websites are tracking user activities browsing the web for legitimate or illegitimate reasons, such as targeted advertisements or privacy theft. Hidden websites may perform usage tracking in the background unknown to a user while the user visits a seemingly unrelated website. As a result, user privacy can be seriously compromised.

Typically, websites rely on local data storage in a device for usage tracking. For example, browser cookie is commonly used as a local storage mechanism for websites to store tracking data. Traditional privacy management tools are largely based on managing, for example, browser cookies. However, as technologies evolve, browsers are constantly updated to support new mechanisms for local storage. Thus, new opportunities of usage tracking may open up, intentionally or unintentionally, for websites to take advantage of. As a result, these traditional privacy management tools may give only a false sense of security without keeping up with the newly available mechanisms for usage tracking.

Further, modern browsers are installed with a variety of third party plug-in modules or extensions. Usually, these plug-ins are provided with their own private local storages requiring separate interfaces for external access. Thus, a browser user may be forced to individually and manually manage potential usage tracking with each private data store and/or interface. With the ever increasing number of third party plug-ins made available on daily basis, such a requirement may soon become impractical and cannot scale.

Furthermore, browser applications may provide implicit local data access mechanisms for built-in capabilities such as browser caches for caching web resources. Typically, such implicit local data access mechanisms are managed without a policy to prevent usage tracking. As a result, certain websites may be capable of identifying such loopholes to piggyback these implicit local data access mechanisms for usage tracking purposes.

Therefore, existing approaches for managing usage tracking do not provide a user with an option to control usage tracking in a unified, comprehensive and robust manner.

SUMMARY OF THE DESCRIPTION

In one embodiment, a device can be configured to block all types of potential tracking data from third party websites. First party websites and associated third party websites can be automatically identified to allow normal loading of web pages retrieved from the first party websites while preventing usage tracking from the associated third party websites. User options can be provided for designating separate blocking mechanisms to block usage tracking against different websites. Blocking mechanisms may be activated to remove, reduce and/or reject tracking data via different levels, such as blocking all tracking data, blocking tracking data from third party websites, not blocking any tracking data or other applicable blocking options.

In another embodiment, multiple lists of known websites or domains may be provided to dynamically apply blocking mechanisms for loading resources from websites of the lists. A user may be allowed to configure a specific level of data blocking for a particular list. The lists may include blacklists of known trackers and/or white lists of approved websites, for example, which may be automatically maintained via a remote service. In one embodiment, statistics of potential usage tracking activities from a website or domain may be collected for an application capable of loading resources from the website. A user interface may be presented with the statistics relating the website with a blacklist to provide an overall (e.g. Birds Eye) view to facilitate user decisions in removing potential tracking data stored for the website An embodiment of the present invention includes methods and apparatuses that maintain one or more data stores capable of storing local data in a device for loading a resource of a domain. The resource may be loaded to cause one or more data access operations on the data stores. Access to usage tracking data of the device from the domain may depend on at least one of the data access operations. The data access operations may be configured to block the usage tracking data of the device from the domain. The data access operations may be performed on the data stores for the loading of the resource. A web page may be presented to a user when the resource is successfully loaded.

In another embodiment, a plug-in module may be identified for loading a resource of a third party domain. A first party resource of a first party type may be loaded in a device to cause the loading of the resource. The third party domain may be of a third party type with respect to the first party resource of the first party domain, wherein resources from the third party domain are requested via the first party resource of the first party domain. The plug-in module may be configured to block usage tracking on the device from the third party domain. In certain embodiments, the plug-in module may be invoked for the loading of the resource. The first party resource may be presented to a user when the resource is successfully loaded.

In yet another embodiment, in response to a request for a resource of a third party domain, a first party domain may be identified for the third party domain. The request may be caused by a loaded resource of the first party domain. The third party domain may be transparent to a user of a device. A cache of the device may be queried for the resource under the first party domain. Resources of the third party domain in the cache under a separate first party domain may be inaccessible for the querying under the first party domain. The resource under the first party domain may be loaded from the cache if the querying is successful to prevent usage tracking from the third party domain via the cache.

In yet another embodiment, at least one blacklist of domains may be maintained in a device. Each blacklist of domains may include known trackers capable of tracking usage of the device. A history of third party requests for resources of third party domains may be monitored. Each third party request may be made transparent to a user of the device via a loaded resource in the device. The loaded resource may be of a first party domain specified in a request from the user. A user interface may be presented to a user to indicate usage tracking activities according to the history. The usage tracking activities may identify relationships between the first party domains and the blacklist via the third party domains.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 is a flow diagram illustrating one embodiment of a process to configure data access operations in a device to block usage tracking;

DETAILED DESCRIPTION

Figure 1:
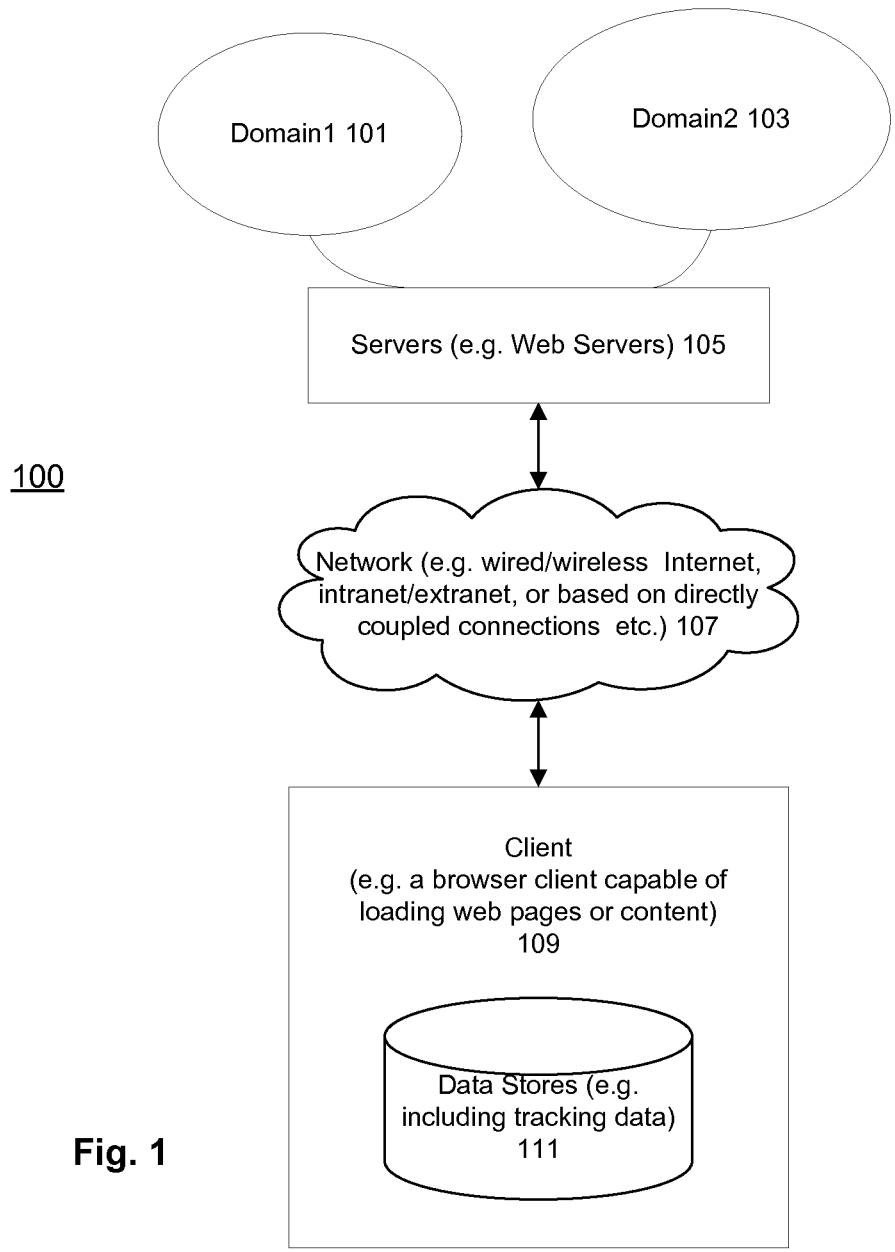
FIG. 1 is a block diagram illustrating one embodiment of network systems with unified tracking data management.

Methods and apparatuses for blocking usage tracking are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, websites providing resources retrievable from client applications, such as web browsers, may be classified into a first party website or a third party web site. For example, a web browser may load a resource (e.g. a hypertext document, an image, a script code or other applicable resource) located in a first party website or a first party domain according to an explicit specification of the first party website. The explicit specification may be indicated in a URL (Universal Resource Locator) address addressing the resource as displayed in an address field (e.g. an address bar) of the browser. In one embodiment, an explicit specification for loading a resource may be based on a user interface request, such as clicking a hyperlink on a web page presented by a browser and/or entering the URL address to an address field of the browser.

In some embodiments, loading an original resource from a website via a web browser (or another application) may automatically cause subsequent loading of another resource from a third party website unaware to a user of the web browser. Mechanisms embedded in the original resource for loading the third party resource (i.e. the resource from the third party websites) may be based on, for example, HTML (Hypertext Markup Language) frame elements, elements for hyperlinking, JavaScript code, Java code, extension module invocation instructions, XML code, or other applicable instructions. A web page presented for the original resource from the first party website may include content, such as an advertisement or other content, provided by or carried in the third party resource and the content of the third party domain may also request content from another third party domain. Alternatively, the third party resource may activate operations (e.g. communicating with the third party website, executing script code etc.) without contributing content to the web page for the original resource (e.g. invisible to a user of the browser).

Storage mechanisms (e.g. for usage tracking) to support local data for a website may be invoked explicitly or implicitly. For example, cookie data may be written or retrieved via set/get requests explicitly specified via HTTP transactions (e.g. requests/response) with the website and/or executing JavaScript code loaded from the website. Alternatively, tracking data for a website may be implicitly stored, for example, in a browser cache by a browser application loading a resource from the website via a browser caching mechanism. In one embodiment, a website may embed a barcode in an image resource (e.g. via a canvas of the image) cached in a browser cache. Subsequent loading of the image resource may allow access to the barcode previously stored for the website. Access to the barcode by a web site can be used to identify the particular data processing system that has stored the barcode. Similarly, a browser cache may cache JavaScript code including a specific value of a variable served from the website. The website may get or set the value for the variable when the browser application executes the cached JavaScript code later retrieved from the browser cache for the website.

In some embodiments, a browser application or a network library may store a file download status for a website to implicitly store local data accessible by the website. For example, the website may determine whether the same person is using the browser based on a value of the file download status indicating how far along (e.g. half way) a file from the web site has previously been downloaded.

In one embodiment, changes in implicit or explicit storage mechanisms supported in a device may occur as a result of installation of new versions of browser applications, new versions of system libraries, such as network interface libraries, updates in plug-in modules, and/or other applicable updates on the device. A website may perform transactions to determine, during runtime, whether certain explicit or implicit storage mechanisms are available in a device. For example, installation of a new plug-in module can provide a local storage mechanism embedded within the plug-in module. A website could detect whether a particular plug-in is available via JavaScript code. Alternatively, a website may detect whether a particular local store is available in a device based on whether transactions for storing and retrieving certain data are successful or not.

In certain embodiments, privacy rules may be applied to prevent local data stored under one website from being accessed by another website regardless of the type or form of the local data. For example, an original resource from a first party website may allow additional loading of resources from third party websites. However, local data stored (e.g. keyed or indexed) by the first party may not be available (e.g. reading, writing, querying etc.) for the third party websites and vice versa.

In one embodiment, a website may access local data as a first party website or as a third party website with different levels of access permissions. More restrictions may be imposed on a website to access local data as a third party website. To illustrate, website "a.com" may be given full access (e.g. read, write, store, query, update, etc.) to local data keyed by "a.com" when loading a resource from website "a.com" as a first party website in response to an explicit request by a user. However, website "a.com" may be restricted to partial access (e.g. read and query only) to local data under website "a.com" when loading a resource from website "a.com" as a third party website, for example, caused by loading an original resource from another website "b.com" as a first party website.

Various levels or degrees of restrictions for data access may be imposed for a third party website, such as "can read existing data but cannot write new data", "can change existing data but cannot create new data (or new entries)", or other applicable limitations. For example, a strictest policy may prohibit a third party website from accessing local data storage of a device completely, even existing data stored under the website (e.g. as a first party website) itself. An intermediate level policy may prevent a third party website from creating new local data while allowing other data access privileges (e.g. read, write, change) to existing local data stored under the website.

In one embodiment, separate counter measures to remove or reduce usage tracking may be provided, for example, to implement a variety of policies to control local data access from websites. A counter measure may be configured to balance compatibility with a web page presented for a first party website vs. levels of restrictions on local data access for third party websites embedded or allowed by the first party website. Compatibility of a web page for a website may be based on whether a resource from the website is successfully loaded to present the web page corresponding to the resource. A counter measure may increase the compatibility with a web page corresponding to a resource of a first party website by pretending that data accesses from embedded third party websites within the resource are successful. Alternatively, the counter measure may return an error message to inform a third party website that a data access request from the third party website fails.

In one embodiment, a counter measure may configure a temporary storage location for storing local data in response to a data (access or storage) request from a third party website. For example, the temporarily stored data for the third party website may be removed substantially immediately after being stored without allowing the third party website to access the temporarily stored data. Alternatively, the temporarily stored data may be accessible during a limited period of time (e.g. during a window session or an application session) and become inaccessible right after the limited period of time expires. Temporary data may be associated with a session identifier with a window and/or an application without being accessible for windows or applications associated with different session identifiers. In one embodiment, temporary data of a session may be deleted when a window or application of the session closes and/or reopens. The counter measure may be applied to return a success status to the data request without actually storing data.

A counter measure may be applied to invoke plug-in modules or extensions in a special mode, e.g. private browsing mode, to prevent the plug-in modules from writing or storing any data in a persistent storage (e.g. a hard disk, flash memory, or other applicable nonvolatile memory components) in a device. Access to local memory storage of the device may be allowed for the plug-in modules without breaking loading of resources (e.g. web pages) associated with the plug-in modules.

In one embodiment, a counter measure may partition a browser cache according to websites (or domains) to limit data access across different partitions of the cache to manage usage tracking. For example, cached resources loaded as a result of loading a resource of a first party domain may be organized as a separate bucket associated with the first party domain (or under the first party domain). A third party website embedded by a first party website may be restricted to a cache partition with a bucket under the first party website. Thus, a tracker website as a third party website embedded under one first party domain may not detect a cached resource from the tracker website as another third party website embedded by a separate first party website.

In some embodiments, multiple levels (or options) of privacy enhancements may be specified for different counter measures to provide flexibility for a user to manage usage tracking. For example, one level of privacy enhancement against a website may cause an application, such as a browser, to operate in a private mode for loading resources from the website. The application may enter a private mode to disable access to local storage in a device such that no data can be stored or retrieved for usage tracking. A higher level of privacy enhancement against a website may block access (e.g. network connection) to the website to cut off usage tracking activities from the website.

In one embodiment, lists of known trackers (e.g. domains, websites) may be provided, for example, as blacklists, to help in identifying potential trackers. The lists may be correlated with a history of websites storing potential tracking data in a device to expose usage tracking activities. A user interface may be configured to explicitly indicate which websites have embedded the known trackers, which known trackers (or potential trackers) have appeared on most (e.g. above a certain percentage) of the websites visited, which websites may be potential trackers unknown in the lists, or other applicable information, etc.

In one embodiment, a blacklist may include trackers that do not contribute visible content to a web page (or invisible via the web page) such as Analytics from Google Inc. Alternatively, a separate blacklist may include trackers that are likely to contribute visible content to a web page (or visible via the web page), such as website "adnetwork.net". The web page may be presented for a resource (e.g. HTML document) which embeds with links to the listed trackers as third party websites.

A user interface associated with lists of known trackers (or blacklists) may provide options to allow a user to configure how the lists are applied to expose usage tracking activities. For example, the user may select to disable a portion or an entirety of the websites in a blacklist and allow the selected or disabled websites to access local data. Alternatively, the user may enable counter measures against potential usage tracking activities from known trackers. In some embodiments, the user may be allowed to activate a counter measure to block resource loading by selected lists of known trackers to prohibit these known trackers from any usage tracking opportunities. The user interface may include statistics derived from usage tracking activities or potential usage tracking activities uncovered or detected from various websites. In some embodiments, usage tracking activities from a website may be monitored as the user browses the web regardless whether the website belongs to a blacklist or not.

FIG. 1 is a block diagram illustrating one embodiment of network systems with unified tracking data management according to one embodiment described herein. Networked systems 100 may include one or more servers 105, e.g. web servers, coupled to one or more clients, such as client 109, via networks 107, which may include wired/wireless networks, Internet, intranet/extranet or other combinations of networks.

Servers 105 may host one or more websites storing resources addressable via network 107. Client 109 may retrieve a resource from servers 105 via a request with an address addressing the resource following a protocol such as HTTP (hypertext transport protocol). In one embodiment, each resource in servers 105 may be associated with a unique address, e.g. a URL (universal resource locator) based address, including a hostname. Typically, a hostname may be a domain name or label assigned to a host computer (or device) as a combination of the host's local name with its parent domain's name. For example, a URL "a.b.com" may consist of a local hostname "a" and a domain name "b.com". Multiple resources may be addressed under a common domain. Illustratively, two resources addressed by http://h1.com/a.htm" and "http//h1.com/b.htm" may be of a common domain "h1.com". A website may represent a domain. In one embodiment, servers 105 may stores resources from multiple domains including domain_1 101 and domain_2 103. Each resource may include text data (e.g. hypertext document, web page etc.), binary data (e.g. images, sound files, video, or other media content etc.), binary executables (e.g. dynamic link libraries), or other applicable data.

Client 109 may be a browser application or other applications running in a client device to perform transactions with server 105. For example, client 109 may load resources (e.g. web pages or content) from server 105 via the transactions. In one embodiment, client 109 may access data stores 111 as a result of loading resources from server 105 and/or performing transactions with server 105. Data stores 111 may be based on memory (e.g. DRAM device) or locally coupled mass storage device (e.g. hard drive, flash memory or other applicable storage devices). Client 109 may be capable of configuring accessing to data stores 111 to control usage tracking from websites, such as domains 101, 103 via servers 105. In one embodiment, client 109 may send data belonging to a domain_1 101 from data stores 111 when performing transactions with servers 105 to retrieve a resource addressed within domain_1 101. Alternatively, client 109 may store data (e.g. usage tracking data) for domain_1 101 as a result of loading a resource of domain_1 101 retrieved from servers 105.

Figure 2:
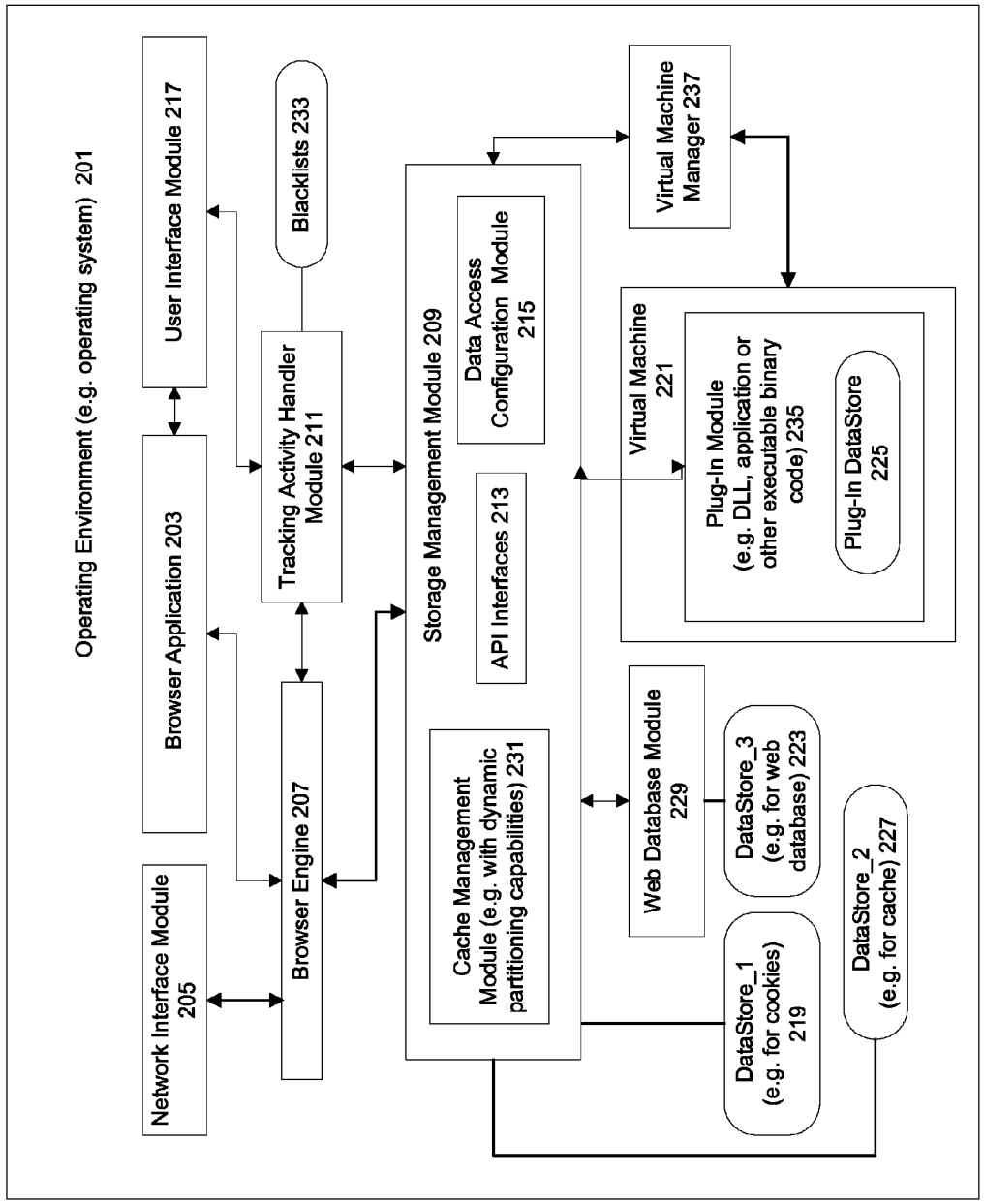
FIG. 2 is a block diagram illustrating an exemplary system for blocking usage tracking.

FIG. 2 is a block diagram illustrating an exemplary system for blocking usage tracking according to one embodiment described herein. In one embodiment, system 200 may be based on a client device, e.g. including client 109 of FIG. 1, running an operating environment 201. System 201 may include a browser application 203 which may be a standard browser application, e.g. Safari from Apple Inc. of Cupertino, Calif., Internet Explorer from Microsoft of Redmond, Wash., or other applicable browsers, capable of retrieving and rendering web content (e.g. a resource hosted in servers 105 of FIG. 1) based on standard specifications, such as HTML, HTTP, or other applicable specifications. Browser application 203 may be capable of providing browsing utilities such as history, bookmarks, favorites, etc.

In one embodiment, system 200 may include a browser engine 207 capable of accessing local data storage, such as data stores 111 of FIG. 1, for remote domains, such as domain_1 101 and domain_2 103 of FIG. 1. Browser engine 207 may parse (or understand) a web resource, such as an HTML document, to display a web page corresponding to the web resource. For example, browser engine 207 may generate an internal data structure, such as a DOM (document object model) structure, from the web resource for presenting the web page.

In some embodiments, browser engine 207 may access (e.g. read, write, update etc.) local data storage via storage management module 209, for example, to store usage tracking data for a domain. Local data storage may include multiple data stores, such as datastore_1 219, datastore_2 227, datastore_3 223, plug-in datastore 225, or other applicable data stores available for browser engine 207. Each data store may store a separate type of data requiring a separate data interface mechanism. The number of data stores or data types to store local data in system 201 may be unbounded and can change dynamically, for example, with updates via installation/revisions of applications, system components, libraries, modules or other binary components.

In one embodiment, storage management module 209 may include data interface mechanisms to access each available data store for browser engine 207. For example, storage management module 209 may directly access datastore_1 219 and/or datastore_2 227. Access to datastore_1 219 may be based on web cookie specifications of Request For Comments 2965, "Http State Management Mechanism", October, 2000, to set or get cookie data as a piece of text. Access to datastore_2 227 may be based on web caching mechanism for storing, sharing and/or reusing copies of documents retrieved from web servers, such as resources hosted in servers 105 of FIG. 1, via network interface module 205. A same origin privacy policy may be implemented within storage management module 209 to prohibit a web site (or a domain) from accessing data stored (or keyed, indexed) by a different domain.

In one embodiment, cache management module 231 can dynamically impose partitions on a cache space, such as datastore_2 227, allocated for browser engine 207 which implicitly caches resources retrieved from websites, for example, to improve browser performance. Each partition or silo of the cache space may be associated with a separate first party website to store resources retrieved from third party websites introduced by the first party website. Cache management module 231 may limit a third party website of a first party website to access (e.g. store/query/retrieve) a cache partition under the first party website only. Thus, a third party website of one first party website may not be able to access a resource stored for the third party website under a separate first party website. In one embodiment, cache management module 231 may require an index based on a first party website in addition to a separate index based on a third party website of the first party website for caching a resource from the third party website. Alternatively, cache management module 231 can maintain dynamic partitions of cache space allocated separately for different first party websites.

Storage management module 209 may include API (application programming interface) interfaces 213 for accessing data stores, such as datastore_3 223 or plug-in datastore 225, indirectly via supported APIs. Separate API interfaces may be invoked to access different data stores. For example, Web Database Module 229 may support interface to datastore_3

223 based on APIs for web SQL databases as specified in W3C working group note, Nov. 18, 2010. Plug-in module 235 may support API interface 213 to expose an interface to plug-in datastore 225 which is privately managed by plug-in module 235. In one embodiment, API calls for accessing local storage, e.g. via API interfaces 213, may include parameters identifying a website or domain as a first party website or a third party website. Thus, API requests may be called to access data for the same website in a data store using different parameters identifying whether the website is a first party type or a third party type.

A plug-in module (or plugin, plug-in) may include a set of software components (e.g. dynamically linked libraries (DLL) or other executable binaries), that add specific abilities to a larger software application, such as browser application 203. For example, browser application 203 may support plug-ins to enable customizing browser functionality to play video (e.g. Flash Player from Adobe Inc. or QuickTime from Apple Inc., Java from Oracle Inc., Silverlight from Microsoft Inc., etc.), scan for viruses, display new file types, or perform other applicable functions. The set of plug-in modules installed or loaded in system 201 may change dynamically, depending on, for example, configurations of browser application 203, browser engine 207 or other applicable software components.

In one embodiment, browser application 203, e.g. a standard browser such as Safari from Apple Inc., Internet Explorer from Microsoft Inc., etc. may receive user requests via user interface module 217 to access a web page or retrieve a resource addressed by a unique identifier, such as a URL. A user request may be based on a URL address entered (e.g. in an address field) or a link selected (e.g. via user clicks on a hyperlink, a bookmark link, or a history link) on a user interface of browser application 203. In response, browser application 203 may forward the resource request to browser engine 207 for loading and/or rendering the requested resource, for example, remotely via network interface 205. Alternatively, or optionally, browser engine 207 may retrieve the requested resource locally from a local cache, such as datastore_2 221 to reuse a previously fetched copy of the resource and/or reduce unnecessary network bandwidth usage.

In some embodiments, while loading a resource, browser engine 207 may automatically fetch additional resources in a manner unaware to a user of browser application 203. For example, browser engine 207 may load a hypertext document, such as an HTML document, addressed by a first address to render a web page requested by the user. The hypertext document may include a link to a resource with a second address, e.g. based on source attribute of a frame element for another HTML document, an image element for an image file, or other applicable hypertext elements. Browser engine 207 may load the resource of the second address automatically and recursively load other resources linked in a similar manner before completing loading the document of the first address. In one embodiment, browser engine 207 may record (or store) a parent child relationship between domains of the first and second addresses for managing tracking data associated with these domains.

In one embodiment, a parent domain may be a first party domain and a child domain may be a third party domain. A first party domain, for example, may correspond to a domain or subdomain presented in an address bar of a browser application, such as application 203. Data (e.g. cookies or other tracking data) stored via resources of a first party domain may be first party data. In some embodiments, a domain associated with a web page may be a third party domain if the domain is different from a first party domain indicated in an address bar for the web page. Data stored during loading a resource of a third party domain (or third party resource) may be third party data. Browser engine 207 may identify a website automatically redirected via a first party website (e.g. based on HTTP status code, meta element of HTML resource, and/or other applicable mechanisms) as another first party website.

A domain may access local data, such as data stored in datastore_1 219, datastore_2 227, datastore_3 223, plug-in datastore 225, via operations initiated in browser engine 207. For example, browser engine 207 may retrieve, via storage management module 209, data keyed by a domain of an address of a resource to conduct transactions (e.g. request/response) with a server of the domain to receive resources from the domain. As a result, the server of the domain may obtain or update local data, for example, via HTTP cookie get/set operations, associated with the domain from client system 200. Typically, browser engine 207 may prohibit a domain from accessing local data keyed (or indexed) by other domains.

Alternatively, browser engine 207 may perform operations specified in a resource of a domain to access (e.g. read/write) local data for the domain. For example, an HTML resource of the domain may include script codes (e.g. JavaScript codes or other script codes) for reading or writing usage tracking data for the domain. Browser engine 207, when loading the HTML resource, may invoke a corresponding script engine, such as Javascript engine or other script engines, to execute the script codes to update data for the domain via storage management module 209. Resources from a domain may cause browser engine 207 to perform operations to hide usage tracking data, such as storing multiple copies of data items in separate data stores for the domain or resurrecting (or duplicating) information stored in one data store to other data stores for the domain.

In some embodiments, a resource from a domain may include instructions to invoke a plug in extension, such as plug-in module 235 which may access its own data store, such as plug-in datastore 225 to update data for the domain of the resource. Browser engine 207 and/or plug-in modules may perform operations specified in the resource to conduct transactions with a remote server of the domain, e.g. via network interface module 205, to access local stores for usage tracking. Thus, a user may browse a web page of one domain to load, e.g. via browser application 203, resources of additional domains linked directly or indirectly from the web page to store and access usage tracking data for these additional domains in the background unknown to the user.

In one embodiment, data access configuration module 215 may dynamically configure implementations of data access operations to prohibit or reduce usage tracking activities from these websites, for example, in response to receiving access requests when loading resources from websites. Access configuration for local data stores may be determined according to user selection of counter measures against usage tracking, for example, via user interface module 217. Data access configuration module 215 may change implementations of underlying access operations (e.g. read/write/create/delete etc.) to local data stores for balancing control of usage tracking vs. normal working of a web page.

For example, data access configuration module 215 may instruct virtual machine manager 237 for a configuration to invoke plug-in module 225 under virtual machine 221 to isolate plug-in datastore 225 to prohibit usage tracking, for example, from a third party website via plug-in module 235. Virtual machine 221 may be a completely isolated operating system installed within system 201 by either software emulation or hardware virtualization. As a result, local data stored in other instances of plug-in module 235 within system 201 may not be available within virtual machine 221 and vice versa. Web pages relying on plug-in module 235 may still work normally via browser application 203 protected from usage tracking via plug-in datastore 225 by virtual machine 221. Alternatively, data access configuration module 215 may configure plug-in module 235 to operate in a special mode, such as private browsing mode, without writing data to plug-in datastore 225 to reduce possibility of usage tracking.

Data access configuration module 215 may dynamically configure access operations performed for data access requests, for example, received from browser engine 207, to prevent usage tracking from a third party website. In one embodiment, a data access request may correspond to writing, storing, reading and/or querying potential usage tracking data from a data store, such as datastore_1 219, datastore_2 227 or datastore_3 223, etc. Multiple options of access operations may be available for one data access request. Data access configuration module 215 may determine which available options of access operations to invoke or perform for the data access request.

For example, data access configuration module 215 may determine not to perform any access operation (e.g. do nothing) but return a normal status code indicating requested data access has been completed. Alternatively, a limited time period may be imposed on effects of an access operation. An undo access operation on the data store may be performed right after expiration of the limited time period to undo changes on a data store by the access operation previously performed. In one embodiment, the time period may correspond to a session of a window displayed via user interface 217 or associated with an application which is running. Thus, the time period may expire when the corresponding window closes or application exits. A short time period may be specified to, for example, remove usage data from a data store right after it is written to the data store without possibility of being accessed.

Data access configuration module 215 may configure which data stores and/or which data items in which data stores should not be put in a permanent storage device, such as hard disks, flash memory or other nonvolatile storage devices, to prevent usage tracking. For example, data items keyed by third party websites may not be permanently stored. Thus, potential usage tracking data may not survive a device on/off cycle.

Alternatively or optionally, data access configuration module 215 may determine parameter values for API calls to allow dynamic selection of data access operations to implement the API calls for preventing usage tracking from third party websites. For example, In one embodiment, arguments in an API call may include an identifier indicating whether a first party website or a third party website causes the API call. The API calls may be invoked via API interface 213 to access local data for loading resources from websites in browser engine 207.

In one embodiment, tracking activity handler module 211 may provide a unified user interface via user interface module 217 to allow a user to manage usage tracking data associated with various domains. Tracking activity analyzer module 211 may identify embedding or linking relationships among websites according to resources loaded from the websites via browser engine 207. For example, tracking activity handler module 211 may determine which websites are third party websites for a first party website. Tracking activity module 211 may record a history of resource loading from first party and/or third party websites via browser engine 207.

In one embodiment, blacklists 233 may include one or more lists of known trackers (or websites) which may be pre-configured or dynamically configured, for example, via a remote service or synchronized with other devices via network interface module 205. Alternatively or optionally, a user may build customized lists in blacklists 233 via user interface module 217. In one embodiment, tracking activity handler module 211 may correlate a history of websites accessed by browser engine 207 and known trackers in blacklists 233. Tracking activity handler module 211_may present a user interface to expose to a user which websites in a history of browser application 203 are known trackers according the correlation.

In certain embodiments, tracking activity handler module 211 may generate statistics on browsing activities to reveal degrees of usage tracking activities from known trackers of blacklists 233. For example, a user interface presentation may include information related to number of times a known tracker has been accessed as a third party website, number of different known trackers allowed or embedded by a first party website, total number of known trackers allowed by the first party website, or other applicable statistics.

In one embodiment, tracking analysis handler module 211 may provide a user interface to allow a user to invoke counter measures for reducing or eliminating usage tracking against exposed domains, known trackers and/or future unknown domains. For example, in response to a user request which identifies one or more domains (e.g. one list in blacklists 233) for one or more counter measures, tracking activity handler module 211 may instruct storage management module 209 (e.g. via data access configuration module 215) to configure specific data access operations for the identified domains to interface with local stores. In some embodiments, a user may configure a whitelist (or white list) of domains to allow local data access for these domains without invoking counter measures to limit access to local data. Alternatively, conflicts (e.g. based on common domains) between a blacklist and a white list may be presented to a user to resolve.

Figure 3:
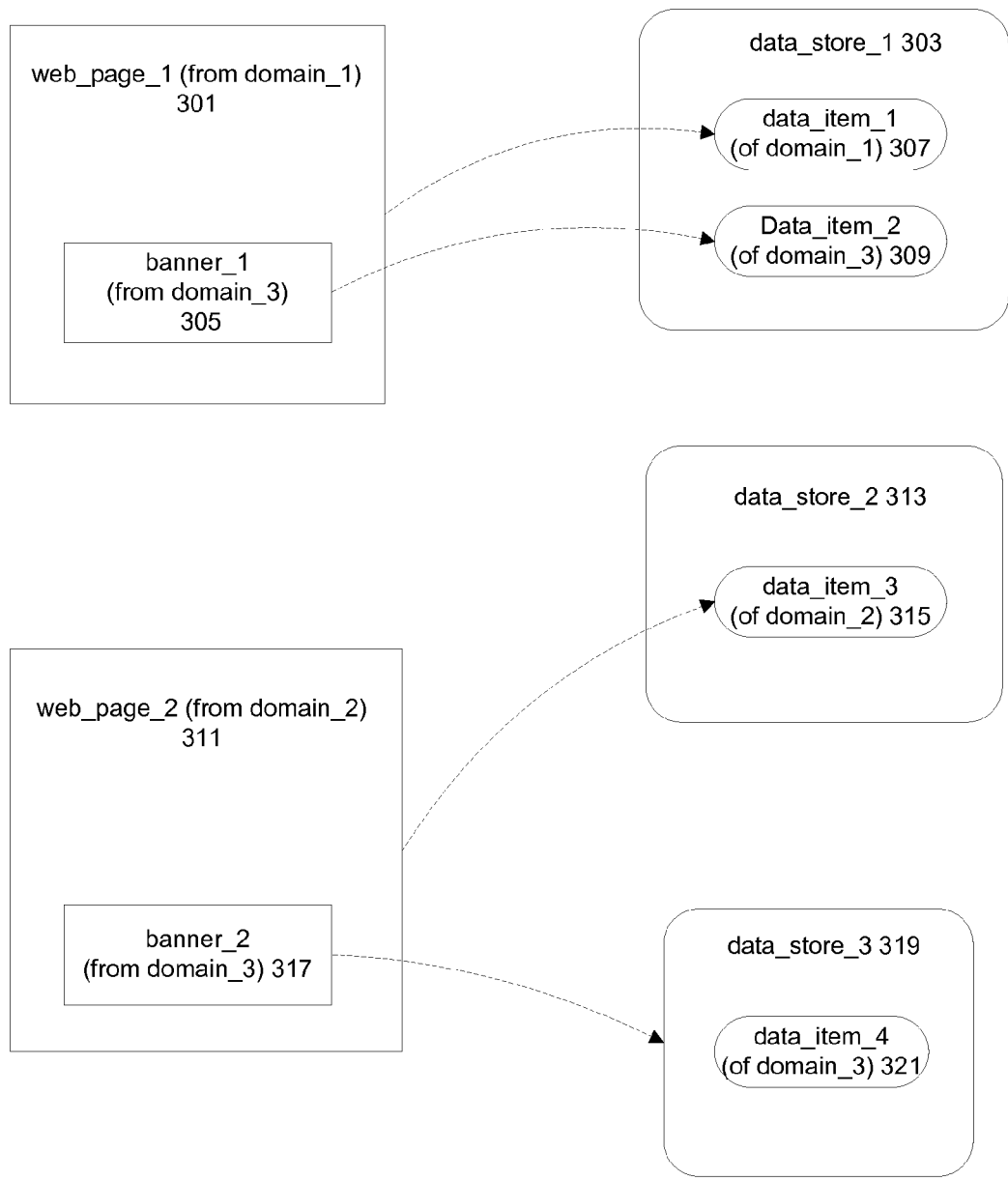
FIG. 3 illustrates an example of collecting usage tracking data by a third party website.

FIG. 3 illustrates an example of collecting usage tracking data by a third party website according to one embodiment described herein. Example 300 may be based on a client system, such as system 200 of FIG. 2. In one embodiment, web_page_1 301 may represent an HTML document from domain_1. Web_page_1 301 may embed banner_1 305, for example, as a hyperlink to an image resource from domain_3 different from domain_1. Data_item_1 307 may be stored in data_store_1 303 indexed by domain_1 as a result of loading web_page_1 301. Data_item_2 309 indexed by domain_3 may be of the same type of data stored in data_store_1 303 as a result of loading banner_1 305 from domain_3. In one embodiment, domain_1 may allow domain_3 to store data_item_2 309 according to a parent child (or embedding) relationship between domain_1 and domain_3.

Separately, web_page_2 311 may embed banner_2 317, for example, as a hyperlink to a multimedia resource from domain_3. Data_item_3 315 may be stored in data_store_2 313 indexed by domain_2 as a result of loading web_page_2 311. Data_item_4 321 indexed by domain_3 may be stored in data_store_3 319 as a result of loading banner_2 317 from domain_3. Each data store, such as data_store_1 303, data_store_2 313 or data_store_3 319 may store different types of data items keyed by associated domains. In one embodiment, a user may explicitly request loading of web_page_1 301 and web_page_2 311. In contrast, loading of banner_1 305 and banner_2 317 may be hidden from the user. For example, domain_1 and domain_2 can be first party domains with domain_3 as a third party domain for web_pages_1 302 and web_page_2 311.

In some embodiments, loading of banner_2 317 of domain_3 may initiate usage data collection for domain_3. For example, data items keyed under domain_3 in a client device may be collected from each data store, such as data_store_1 303, data_store_2 313 and data_store_3 319. The collected data may be forwarded to a server of domain_3 for usage tracking purposes. Alternatively, data_item_4 321 of domain_3 may be generated according to data_item_2 309 of domain_3 for usage tracking update. In one embodiment, data_item_2 309 and data_item_4 321 may eventually be sent to domain_3 when loading other advertisement contents from domain_3 or visiting their websites of domain_3. Thus, domain_3 may then build up usage tracking data or compile a profile on the user across different websites or domains embedding domain_3 (or domain_3 has footprints on).

In one embodiment, information of a user may be collected based on websites the user visits via a browser. For example, an HTML document from domain_1 for web_page_1 301 may include a URL link "http://a.com/ad?location=sjc" to fetch banner_1 305 from domain_3 corresponding to "a.com". As a result, data_item_2 309 stored in data_store_1 303 may include "location: sjc" to indicate a user located in a location identified by "sjc". Subsequently, another HTML document retrieved by the user, for example, from domain_2 for web_page_2 311 may include a URL link "http://a.com/ad?food=Chinese" to fetch banner_2 317 from domain_3. As a result, data_item_4 321 stored in data_store_3 319 may include "food: Chinese" to indicate a user preference in Chinese food. Domain_3 may establish a user profile of location and food preference by collecting data items stored for domain_3 from multiple data stores.

FIG. 4 is a flow diagram illustrating one embodiment of a process to configure data access operations in a device to block usage tracking according to one embodiment described herein. Exemplary process 400 may be performed by a processing logic that may comprise hardware (circuitry, dedicated logic, etc.), software (such as is run on a dedicated machine), or a combination of both. For example, process 400 may be performed by some components of system 200 of FIG. 2. At block 401, the processing logic of process 400 can maintain one or more data stores capable of storing local data in a device for loading a resource of a domain.

In one embodiment, loading a resource may cause one or more data access operations on data stores allocated, for example, in a local memory of a device. The processing logic of process 400 may store/access usage tracking data of the device for domains or trackers by performing data access operations incurred during loading of resources from these domains. At block 403, the processing logic of process 400 may configure the data access operations to block usage tracking data of the device from these domains. For example, the data access operations may be configured according to user selections of counter measures to limit data access capabilities via a user interface.

At block 405, the processing logic of process 400 may perform the configured data access operations on data stores as a result of loading resources from these domains. In one embodiment, the resources may be successfully loaded to present web pages to a user regardless limited data access via the configured data access operations to remove or reduce usage tracking from these domains.

Figure 5:
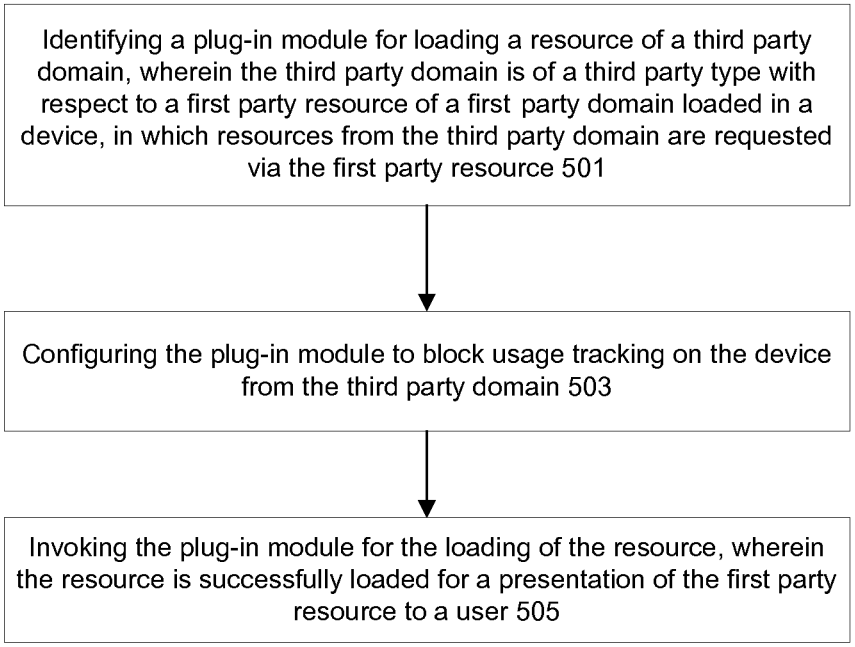
FIG. 5 is a flow diagram illustrating one embodiment of a process to block usage tracking of a plug-in module.

FIG. 5 is a flow diagram illustrating one embodiment of a process to block usage tracking of a plug-in module according to one embodiment describe herein. Exemplary process 500 may be performed by a processing logic that may comprise hardware (circuitry, dedicated logic, etc.), software (such as is run on a dedicated machine), or a combination of both. For example, process 500 may be performed by some components of system 200 of FIG. 2. At block 501, the processing logic of process 500 can identify a plug-in module for loading a resource of a third party domain.

The processing logic of process 500 may receive a user instruction for loading a first party resource from a first party domain. A third party domain may be a domain of a third party type with respect to the first party resource of the first party domain. For example, loading of the first party resource may automatically cause loading of a resource of the third party domain unaware to the user.

At block 503, the processing logic of process 500 may configure a plug-in module to block usage tracking on a device from a third party domain. The processing logic of process 500 may invoke the plug-in module for loading of a resource of the third party domain at block 505. In one embodiment, the processing logic of process 500 may configure the plug-in module to restrict local data access capabilities of the plug-in module for preventing usage tracking. The resource from the third party may be successfully loaded invoking the configured plug-in module for a presentation of a first party resource to a user. The restriction configured for the plug-in module may be hidden from the user.

In one embodiment, the processing logic of process 500 may configure a plug-in module to run under a virtual machine to sandbox the plug-in module from accessing local data stores. Alternatively, the processing logic of process 500 may detect (e.g. via API calls) whether the plug-in module supports private browsing mode without writing data to local data stores. The processing logic of process 500 may instruct the plug-in module to run in the private browsing mode to prevent usage tracking via the plug-in module. Thus, the plug-in module may volunteer not to access local data in the private browsing mode.

In some embodiments, for example, if a virtual machine is not available, the processing logic of process 500 may configure location (e.g. directory) settings of a plug-in module to redirect local data access operations to a temporary location or read only location for the plug-in module. Data access operations via the plug-in module may be allowed as if the configured location is a normal storage location. Data written to the configured location may not be read, accessed or permanently stored to prevent potential usage tracking via the configured plug-in module.

Alternatively, the processing logic of process 500 may configure data access operations requested via the plug-in module as empty operations to pretend performing normal data access operations to the plug-in module without actually writing/reading data to local data stores. In one embodiment, the processing logic of process 500 may configure the data access operations requested via the plug-in module to send back error messages indicating the restrictions on accessing local data stores.

Optionally, the processing logic of process 500 may configure a restriction on local data access for a plug-in module based on a unique session (or session identifier) associated with the plug-in module. A session may be valid for a limited period of time, such as a window session, a tab session, an application session or other applicable session. For example, a temporary data store associated with the session for the plug-in module may be allocated for data access operations from the plug-in module. The temporary data store may not be accessible from another window or application of a different session. Typically, the temporary data store associated with a session may be removed or deleted once the session expires, such as when a window closes/reopens, an application closes/reopens, or after a certain configured period of time, etc.

In some embodiments, the processing logic of process 500 may partition a data store according to first party websites. A third party website which invokes a plug-in module may be restricted to perform local data access operations within a partition of a first party website associated with the third party website. As a result, the third party website may be prohibited from usage tracking across multiple first party websites.

Figure 6:
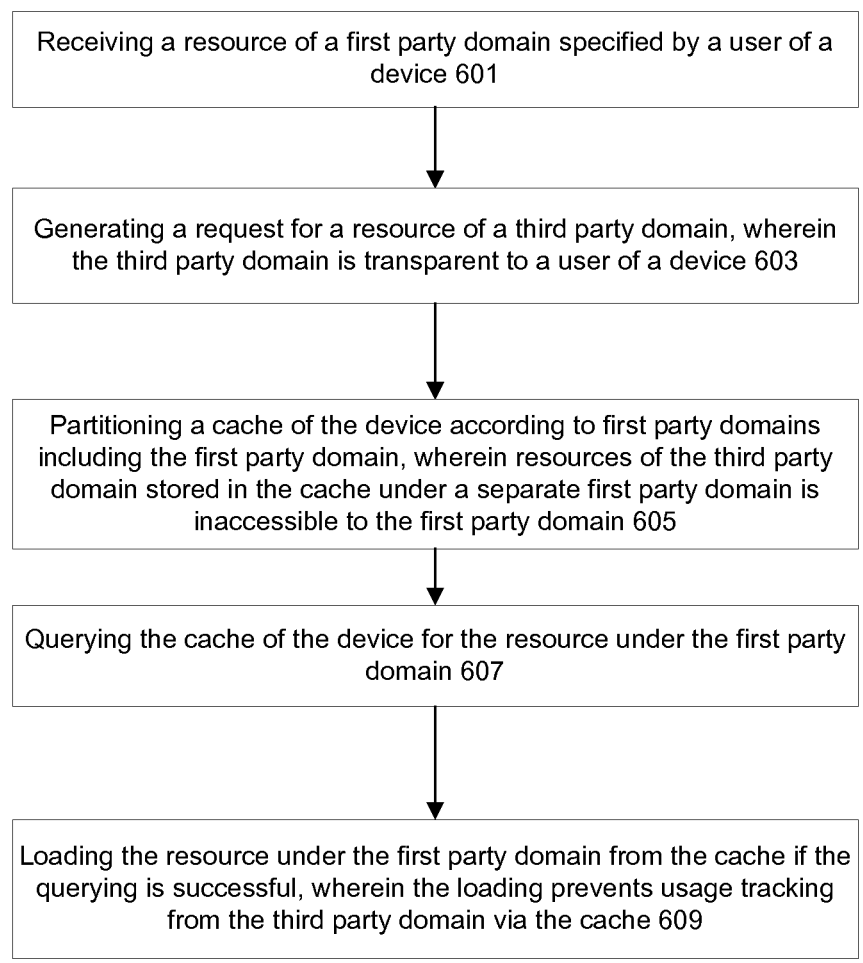
FIG. 6 is a flow diagram illustrating one embodiment of a process to partition a cache to block usage tracking from a third party domain.

FIG. 6 is a flow diagram illustrating one embodiment of a process to partition a cache to block usage tracking from a third party domain according to one embodiment describe herein. Exemplary process 600 may be performed by a processing logic that may comprise hardware (circuitry, dedicated logic, etc.), software (such as is run on a dedicated machine), or a combination of both. For example, process 600 may be performed by some components of system 200 of FIG. 2. At block 601, the processing logic of process 600 can receive a resource of a first party domain specified by a user of a device. At block 603, the processing logic of process 600 may generate a request for a resource of a third party domain. The request of the third party domain may be transparent to the user.

In one embodiment, at block 605, the processing logic of process 600 may partition a cache of a device according to first party domains. Each partition of a first party domain may be accessible by the first party domain and third party domains of the first party domains. A separate first party domain or a third party domain of the separate first party domain may not access (e.g. query) the partition of the first party domain. At block 607, the processing logic of process 600 may query the cache for the resource under the first party domain for the request. The processing logic of process 600 may load the resource under the first party domain from the cache at block 609 if the querying is successful. The loading under the first party domain may prevent usage tracking from the third party domain via the cache.

In some embodiments, the processing logic of process 600 may prohibit an application, such as a browser application, from implicitly accessing a cache for a third party website to prevent the third party website from using the cache indirectly as local storage for usage tracking. Alternatively, the processing logic of process 600 may create multiple partitions under different first party websites for one common third party website to restrict the common third party website from accessing data cross multiple partitions. Thus, data stored for the common third party website under one first party website may not be available for the common third party website under another first party website to limit potential usage tracking by the common third party website. In one embodiment, the processing logic of process 600 may balance the required size of the cache vs. degrees of potential usage tracking from third party websites using the cache. A cache with partitions under first party websites may lower degrees of potential usage tracking with a larger cache capacity requirement than a cache without partitions.

Figure 7:
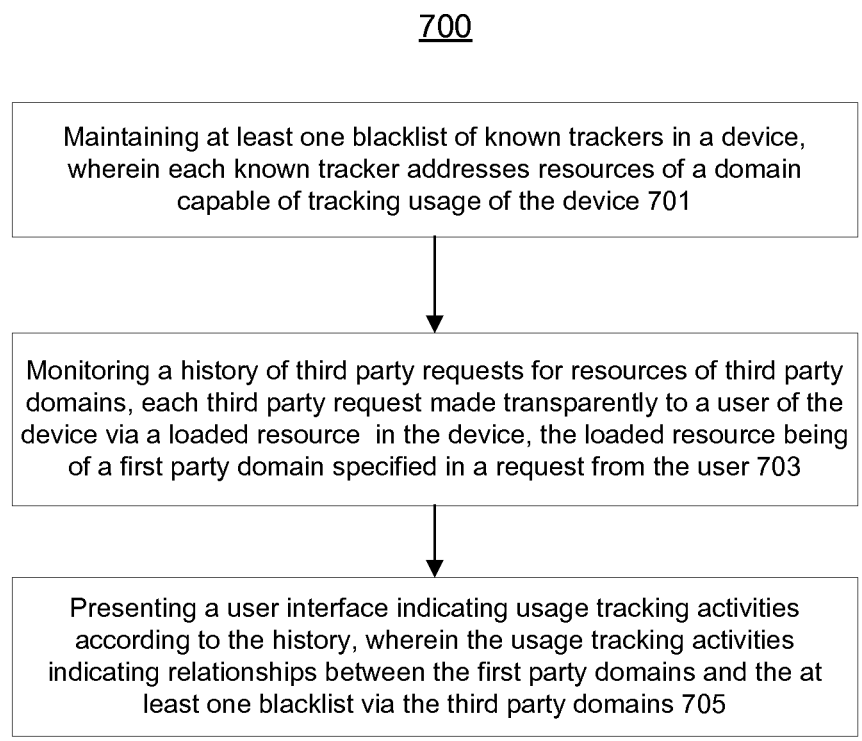
FIG. 7 is a flow diagram illustrating one embodiment of a process to maintain a blacklist of known trackers for blocking usage tracking.

FIG. 7 is a flow diagram illustrating one embodiment of a process to maintain a blacklist of known trackers for blocking usage tracking according to one embodiment describe herein. Exemplary process 700 may be performed by a processing logic that may comprise hardware (circuitry, dedicated logic, etc.), software (such as is run on a dedicated machine), or a combination of both. For example, process 700 may be performed by some components of system 200 of FIG. 2. At block 701, the processing logic of process 700 can maintain at least one list, such as a blacklist or a white list, for resources of domains in a device. Each blacklist may include known trackers capable of tracking usage of the device. In one embodiment, a resource hosted by a domain may belong to a known tracker while another resource hosted by the same domain may be valid (or not belonging to a tracker). For example, a known tracker may include a URL pattern, such as "www.foo.com/eve1/", to address resources of a domain capable of tracking usage of a device. However, resources of the same domain addressed via another URL pattern, such as "www.foo.com/good/", may be benign incapable of tracking usage of a device.

In some embodiments, a white list for resources of domains may include websites permitted by a user for local data access or usage tracking, for example, to provide specific features or functions on services provided by the websites in the white list. The processing logic of process 700 may provide mechanisms to allow a user to configure the user's own blacklists or white lists of trackers, such as sharing lists of trackers with other users or devices, subscribing lists of known trackers from remote services, and/or other applicable list configuration mechanisms.

At block 703, in one embodiment, the processing logic of process 700 may monitor a history of third party requests for resources of third party domains, for example, via a browser application. A third party request may be automatically invoked via a loaded resource of a first party domain transparently to a user of a device. A first party request for loading the resource of the first party domain may be explicitly specified by the user. At block 705, the processing logic of process 700 may present a user interface indicating usage tracking activities according to the history. The usage tracking activities may indicate relationships between the first party domains and the blacklist via the third party domains. For example, the user interface may include statistics summarizing number of third party domains identified in the blacklist for a first party domain. The user interface may provide detailed information (e.g. in addition to domain names) on the identified third party domains allowed by the first party domain to assist a user tracking down sources of the third party domains.

In one embodiment, different counter measures may be applied to websites matching different blacklists. In other words, separate blacklists may be associated with different levels or degrees of usage tracking for privacy control. A website may be given enough usage tracking or local data access capabilities such that services from the website, such as presenting a full functioning or complete webpage, will not be disrupted. For example, the processing logic of process 700 can block communications or network connections as a top level of privacy control to websites in a particular blacklist to prohibit usage tracking from these websites. Alternatively, the processing logic of process 700 may allow local data access from websites from a separate blacklist when the websites are communicated as first party websites, but completely block communications with the websites as third party websites.

The processing logic of process 700 may analyze services and/or resources provided by a website to determine severity of disruption in user browsing experiences to turn off usage tracking from the website. For example, the processing logic of process 700 may identify a third party website embedded in a webpage without contributing visible or noticeable content for a user (e.g. hidden from the user). Thus, the webpage may be presented with the third party website blocked without impacting user experience (e.g. with low severity in disruption). In one embodiment, the processing logic of process 700 may analyze a DOM structure generated for a webpage to determine whether a resource loaded from a website is hidden (e.g. does not provide visible content) from a user browsing the webpage. In some embodiments, the processing logic of process 700 may dynamically block a connection with a website according to a DOM based analysis which indicates suspicious usage tracking from the website (e.g. resources from the website are hidden in a DOM structure).

In one embodiment, the processing logic of process 700 may actively record or watch browsing activities of websites regardless which blacklists and/or white lists these websites belong to, and/or independent of which counter measures or levels of privacy control are imposed on the websites. The processing logic of process 700 may generate a report to reveal potential usage tracking activities from third party websites and/or first party websites via user browsing activities based on the record. The report may include usage tracking statistics and/or relationships with configured blacklists/white lists of known websites to assist a user to judge likelihood of usage tracking. Counter measures to guard against the websites may be imposed according to the statistics, for example, to balance between optimizing privacy (e.g. by blocking connections to a website completely) and optimizing website compatibility (e.g. by allowing full local data access from the website).

Figure 8:
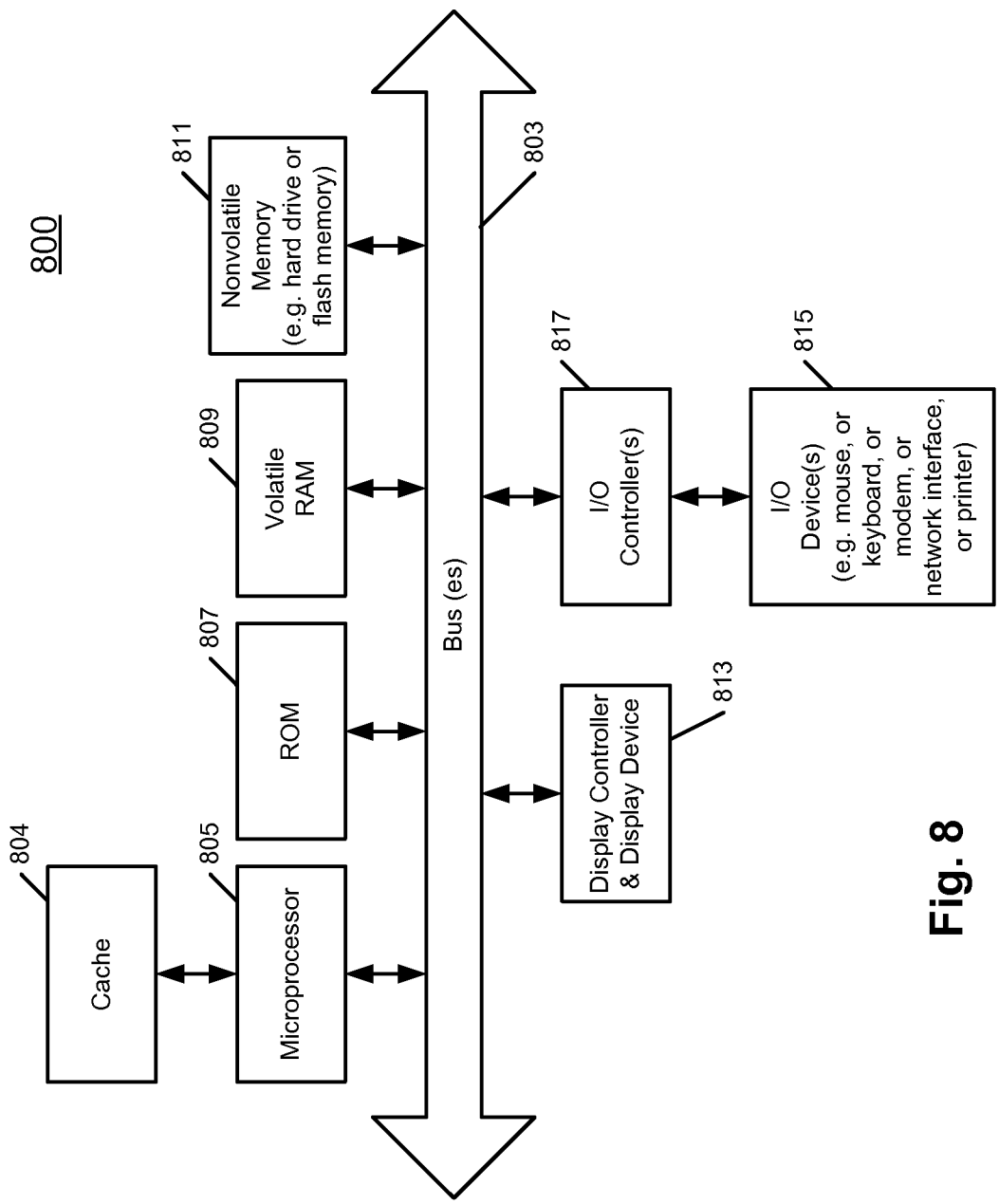
FIG. 8 illustrates one example of a data processing system such as a computer system, which may be used in conjunction with the embodiments described herein.

FIG. 8 shows one example of a data processing system such as a computer system, which may be used with one embodiment in the present invention. For example, the system 800 may be implemented as a part of the system shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory. Microprocessor 805 can be coupled to Cache 804.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, causes the machine to perform a method, the method comprising:
 maintaining one or more data stores storing local data in a device, the local data including usage tracking data of the device, the usage tracking data accessible via one or more data access operations on the data stores, wherein statuses returned from the data access operations indicate whether the data access operations are successful;
 configuring the data access operations to block a domain from access to the usage tracking data of the device, the data access operations configured to return the statuses indicating that the data access operations are successful while the domain is blocked from the access to the usage tracking data of the device;
 loading a resource from the domain for a web page based on the resource, wherein the loading of the resource invokes the data access operations configured for accessing the usage tracking data, wherein whether the web page is compatible depends on whether the statuses indicate success of the data access operations; and
 performing the data access operations on the data stores according to the configuration of the data access operations for the loading of the resource, wherein the resource is successfully loaded for a presentation of the web page to be compatible with the statuses indicating the success of the data access operations performed while the domain is blocked from the access to the usage tracking data.

2. The medium of claim 1, wherein the web page is rendered via a first party resource from a first party domain identified in a request received from a user, wherein the loading of the resource is caused by the first party resource and wherein the loading of the resource is transparent to the user.

3. The medium of claim 2, wherein the data access operations are associated with a session identifier valid for a limited period of time, and wherein the performing the data access operations comprises:
 updating at least one of the data stores with a change associated with the session identifier when the session identifier is valid; and
 removing the change associated with the session identifier from the at least one data stores when the session identifier expires outside the limited period of time.

4. The medium of claim 3, wherein the session identifier is associated with a window displaying the web page in the presentation and wherein the session identifier expires when the window closes.

5. The medium of claim 2, wherein at least one of the data stores includes partitions for separate domains, and wherein the configuration comprises:
 associating the access operations with the first party domain, wherein the access operations are limited to access partitions of the first party domain in the data stores.

6. The medium of claim 5, wherein the data stores are accessed via APIs (application programming interface) and wherein the data access operations are explicitly specified in the resources via the APIs.

7. The medium of claim 5, wherein the data stores includes a cache store, wherein the data access operations to access the cache store and wherein performing the data access operations comprises:
 storing a copy of the resource in a partition of the first party domain in the cache store.

8. The medium of claim 7, the performing the data access operations further comprising:
 retrieving the resource from the partition of the first party domain in the cache store.

9. The medium of claim 1, wherein the device includes a persistent storage device, wherein the data access operations identify one of the data stores, and wherein performing the data access operations comprises:
 storing a data item keyed by the domain to the identified data store with an indicator to prevent storing the data item persistently in the persistent storage device.

10. The medium of claim 1, wherein the resource includes APIs (application programming interface) to invoke the data access operations, and wherein performing the data access operations comprises:
 returning status to the API calls without updating the data stores, the status indicating the API calls complete successfully.

11. The medium of claim 10, wherein the resource includes script code calling the APIs and wherein the script code is executed for the loading of the resource.

12. The medium of claim 10, wherein the API calls include identifiers indicating whether the API calls are caused via resources loaded from the domain.

13. The medium of claim 1, wherein the resource specifies a plug-in module including the data access operations capable of updating one of the data stores associated with the plug-in module, and wherein the plug-in module is independent of data stores other than the associated data store.

14. The medium of claim 13, wherein the configuration comprises:
 invoking the plug-in module within a virtual machine sandboxing the one data store.

15. The medium of claim 13, wherein the configuration comprises:
invoking the plug-in module with a private mode, wherein the data access operations are limited to read access to the associated data store with the private mode.

16. A machine-readable non-transitory storage medium having instructions therein, which when executed by a machine, causes the machine to perform a method, the method comprising:
loading a first party resource from a first party domain to a device for a presentation of a web page based on the first party resource, the loading of the first party resource to cause loading of a resource of a third party domain of a third party type with respect to the first party resource of the first party domain, the loading of the resource of the third party domain to cause data access operations via a plug-in module to access local data stores, the data access operations to return statuses indicating whether the data access operations are successful, and wherein whether the web page is compatible depends on whether the data access operations are successful based on the statuses;
configuring, in response to the loading of the first party resource, the plug-in module to block usage tracking on the device from the third party domain, wherein the data access operations are allowed via the configured plug-in module for the loading of the resource of the third party domain and the data access operations via the configured plug-in module to return the statuses indicating the data access operations are successful with access of the usage tracking blocked from the third party domain; and
invoking the plug-in module configured to perform the data access operations for the loading of the resource of the third party domain, wherein the resource is successfully loaded based on the statuses returned for a presentation of the web page of the first party resource, the web page to be compatible without the usage tracking accessed by the third party domain.

17. The medium of claim 16, wherein the first party resource is loaded according to a request received from a user of the device and wherein the loading of the resource is caused by the first party resource transparent to the user.

18. The medium of claim 16, wherein the plug-in module is associated with a path to a storage location in the device to store local data, and wherein the configuration comprises:
allocating a temporary storage location of a temporary path in the device; and
redirecting the path to the temporary path in the device, wherein the plug-in module is capable of accessing the temporary location via the path and wherein the plug-in module is prohibited from accessing the storage location.

19. The medium of claim 18, wherein the first party resource is rendered in a web page presented to the user and wherein the temporary storage is made inaccessible when the web page is closed.

20. A computer implemented method comprises:
maintaining one or more data stores storing local data in a device, the local data including usage tracking data of the device, the usage tracking data accessible via one or more data access operations on the data stores, wherein statuses returned from the data access operations indicate whether the data access operations are successful;
configuring the data access operations to block a domain from access to the usage tracking data of the device, the data access operations configured to return the statuses indicating that the data access operations are successful while the domain is blocked from the access to the usage tracking data of the device;
loading a resource from the domain for a web page based on the resource, wherein the loading of the resource invokes the data access operations configured for accessing the usage tracking data for the domain, wherein whether the web page is compatible depends on whether the statuses indicate success of the data access operations; and
performing the data access operations on the data stores according to the configuration of the data access operations for the web page based on the resource loaded from the domain, wherein the web page is presented to be compatible with statuses indicating the success of the data access operations performed while the domain is blocked from the access to the usage tracking data.

* * * * *